United States Patent
Ricci et al.

(10) Patent No.: US 10,125,717 B2
(45) Date of Patent: Nov. 13, 2018

(54) METHOD OF OPERATING A FUEL INJECTOR OF AN INTERNAL COMBUSTION ENGINE OF A MOTOR VEHICLE

(71) Applicant: GM GLOBAL TECHNOLOGY OPERATIONS LLC, Detroit, MI (US)

(72) Inventors: Isadora Ricci, Turin (IT); Giorgio Nati, Villar Focchiardo (IT); Cosma Negro, Candelu (IT); Stefano Pellegrino, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 15/361,814

(22) Filed: Nov. 28, 2016

(65) Prior Publication Data

US 2017/0152808 A1 Jun. 1, 2017

(30) Foreign Application Priority Data

Nov. 27, 2015 (GB) .................................... 1520960.4

(51) Int. Cl.
| | |
|---|---|
| *F02M 1/00* | (2006.01) |
| *F02D 41/40* | (2006.01) |
| *F02D 41/02* | (2006.01) |
| *F02D 41/38* | (2006.01) |

(52) U.S. Cl.
CPC ......... *F02D 41/405* (2013.01); *F02D 41/027* (2013.01); *F02D 41/402* (2013.01); *F02D 41/029* (2013.01); *F02D 41/3827* (2013.01); *F02D 41/401* (2013.01); *F02D 41/403* (2013.01); *F02D 2041/389* (2013.01); *F02D 2250/11* (2013.01); *Y02T 10/44* (2013.01)

(58) Field of Classification Search
CPC .............. F02D 2041/389; F02D 41/30; F02D 41/3809; F02D 41/20; F02D 2041/2055; F02D 2041/2058; F02D 41/40; F02D 41/401; F02M 51/0603
USPC ........ 123/445, 446, 456, 472, 475, 478, 480
See application file for complete search history.

(56) References Cited

U.S. PATENT DOCUMENTS

| | | | |
|---|---|---|---|
| 4,197,767 A * | 4/1980 | Leung | F02D 35/023 123/179.16 |
| 2004/0181760 A1* | 9/2004 | Ismailov | F02D 41/20 703/2 |
| 2005/0279867 A1* | 12/2005 | Ismailov | F02D 41/20 239/585.1 |
| 2011/0066354 A1* | 3/2011 | Cassani | F01N 3/0253 701/103 |

(Continued)

FOREIGN PATENT DOCUMENTS

GB 2505512 A 3/2014

OTHER PUBLICATIONS

Great Britain Patent Office, Great Britain Search Report for Great Britain Application No. 1520960.4, dated May 23, 2016.

*Primary Examiner* — John Kwon
(74) *Attorney, Agent, or Firm* — Lorenz & Kopf, LLP

(57) ABSTRACT

A method of operating a fuel injector of an internal combustion engine having a reciprocating piston includes performing a multi after-injection pattern having at least one pair of consecutive injection pulses both starting after a top dead center of the piston and separated by a dwell time shorter than 200 as.

10 Claims, 2 Drawing Sheets

(56) References Cited

U.S. PATENT DOCUMENTS

2011/0192372 A1    8/2011   Guglielmone et al.
2011/0214495 A1    9/2011   Nishiumi

* cited by examiner

METHOD OF OPERATING A FUEL INJECTOR OF AN INTERNAL COMBUSTION ENGINE OF A MOTOR VEHICLE

CROSS-REFERENCE TO RELATED APPLICATION

This application claims priority to Great Britain Patent Application No. 1520960.4, filed Nov. 27, 2015, which is incorporated herein by reference in its entirety.

TECHNICAL FIELD

The present disclosure pertains to a method of operating a fuel injector of an internal combustion engine of a motor vehicle, typically a solenoid fuel injector of a Diesel engine.

BACKGROUND

It is known that a Diesel engine is generally equipped with an injection system that includes a plurality of electrically controlled fuel injectors for injecting fuel directly into cylinders. The fuel injection in each cylinder is generally performed according to a multi-injection pattern having a plurality of injection pulses per engine cycle, including at least one pilot injection, i.e. a fuel injection in a cylinder of the engine that occurs before the Top Dead Center (TDC) of the piston, and one main injection, i.e. a fuel injection that occurs near to the TDC.

In order to increase the temperature of the exhaust gas for regenerating aftertreatment devices, such as for example a diesel particulate filter, or for warming-up the aftertreatment devices, it is known from GB2472816 to perform a multi-injection pattern which includes a plurality of so-called after injections, i.e. fuel injections that start after the main injection or after the piston has passed its top dead center (TDC) position, but still sufficiently near to the TDC for the fuel to burn at least partially inside the cylinder. In practice, the plurality of after injections define a so-called multi after-injection pattern within the multi-injection pattern.

However, the fuel quantity injected by the multi after-injection pattern and the timing of the injection pulses of the multi after-injection pattern impacts on the oil dilution and the fuel consumption of the internal combustion engine, so that a need exists of a method that improves the efficiency of the multi after-injection pattern.

SUMMARY

An embodiment of the disclosure provides a method of operating a fuel injector of an internal combustion engine having a reciprocating piston. A multi after-injection pattern is performed having at least one pair of consecutive injection pulses both starting after a top dead center of the piston and separated by a dwell time shorter than 200 µs. As result, the pair of consecutive injection pulses of the multi after-injection pattern are sufficiently close to so as to be hydraulically fused together. Thus, the total fuel quantity injected into a cylinder in a combination of two consecutive pulses of the multi after-injection pattern may be greater, for the same energizing times of the pulses, than the sum of the fuel quantities separately injected by the two consecutive pulses when, as in conventional conditions, are separated by a dwell time greater than 200 µs. In other words, the same fuel quantity of conventional conditions (i.e. two consecutive pulses separated by a dwell time greater than 200 µs) is achieved by an energization of one or both the two consecutive fused pulses with an energizing time accordingly reduced.

According to an embodiment, the dwell time may be in a range between 80 and 150 µs. In this way, the hydraulic fusion of the pair of injection pulses is more efficient and, for fixed energizing times of the injection pulses it is observed that the lower the dwell time, the higher the increase of injected fuel quantity and the noise reduction.

According to an embodiment, wherein the pair is constituted by the last two injection pulses of the multi after-injection pattern. As a result, being the last injection pulse the one which is the main responsible of the temperature increase of the exhaust gas, the hydraulic fusion of the last injection pulse with the second last injection pulse of the multi after-injection pattern allows to increase the burn efficiency of the last pulse, leading to an increase of the injection rate (injecting more fuel in less time).

According to a further embodiment, the method may include starting a first pulse of the pair and of ending a second pulse of the pair in a range between 20 and 80 angular degrees of a crankshaft from the top dead center of the piston. As a result, a combustion with after injections may be achieved and, at the same time, being the time distance between the start of injection of the previous pulse closer to the end of injection of the following pulse with respect to the conventional conditions, the position of the last two injection pulses of the multi after-injection pattern into the range may be flexibly determined in order to attain a reduction of the oil dilution or a reduction of the fuel consumption or a temperature increase of the exhaust gas.

According to an embodiment of the present disclosure, the method may include the steps of starting the first pulse of the pair and of ending the second pulse of the pair in a subrange of the range, by way of an example included between 70 and 80 angular degrees of a crankshaft from the top dead center of the piston. As a result, an efficient temperature increase of the exhaust gas may be achieved.

By way of an example, in order to attain a reduction of the oil dilution, the method may include determining a start of injection of the first pulse of the pair and an end of injection of the second pulse of the pair, in such a way that the start of injection of the previous pulse is closer to a lower boundary value of the above the subrange than the end of injection of the second pulse of the pair is close to a higher boundary value of the subrange.

As an alternative embodiment, in order to attain a temperature, increase of the exhaust gas, the method may include determining a start of injection of the first pulse of the pair and an end of injection of the second pulse of the pair, in such a way that the end of injection of the second pulse of the pair is closer to a higher boundary value of the subrange than the start of injection of the first pulse of the pair is close to a lower boundary value of the subrange.

The proposed solution, achieving basically the same effects of the method described above, may be carried out with the help of a computer program including a program-code for carrying out, when run on a computer, the method described above, and in the form of a computer program product including the computer program. The method can be also embodied as an electromagnetic signal being modulated to carry a sequence of data bits which represent a computer program to carry out all steps of the method.

Another embodiment of the solution, achieving basically the same effects of the method described above, provides an injection system of an internal combustion engine. The internal combustion engine is provided with a reciprocating piston, the injection system including a fuel injector and an electronic control unit configured for carrying out the method as disclosed above.

Another embodiment of the solution, provides an internal combustion engine equipped with an injection system as above disclosed.

Another embodiment of the solution provides an apparatus for operating a fuel injector of an internal combustion engine provided with a reciprocating piston. The apparatus is configured to perform a multi after-injection pattern having at least one pair of consecutive injection pulses both starting after a top dead center of the piston and separated by a dwell time shorter than 200 μs. This embodiment achieves basically the same effects of the method described above, particularly that of achieving that the total fuel quantity injected into a cylinder in a combination of two consecutive pulses of the multi after-injection pattern may be greater, at the same energizing times of the pulses, than the sum of the fuel quantities separately injected by the two consecutive pulses when, as in conventional conditions, are separated by a dwell time greater than 200 μs. In other words, the same fuel quantity of conventional conditions (i.e. two consecutive pulses separated by a dwell time greater than 200 μs) is achieved by an energization of one or both the two consecutive fused pulses with an energizing time accordingly reduced.

According to an embodiment, the pair of consecutive injection pulses is constituted by the last two injection pulses of the multi after-injection pattern. As a result, being the last injection pulse the one which is the main responsible of the temperature increase of the exhaust gas, the hydraulic fusion of the last injection pulse with the second last injection pulse of the multi after-injection pattern allows to increase the burn efficiency of the last pulse, leading to an increase of the injection rate (injecting more fuel in less time).

According to a further embodiment, the apparatus may be configured to start a first pulse of the pair and end a second pulse of the pair in a range between 20 and 80 angular degrees of a crankshaft from the top dead center of the piston. As a result, a combustion with after injections may be achieved and, at the same time, being the time distance between the start of injection of the previous pulse closer to the end of injection of the following pulse with respect to the conventional conditions, the position of the last two injection pulses of the multi after-injection pattern into the range may be flexibly determined in order to attain a reduction of the oil dilution or a reduction of the fuel consumption or a temperature increase of the exhaust gas.

According to an embodiment of the present disclosure, the apparatus may be configured to start the first pulse of the pair and end the second pulse of the pair in a subrange of the range, by way of an example included between 70 and 80 angular degrees of a crankshaft from the top dead center of the piston. As a result, an efficient temperature increase of the exhaust gas may be achieved.

By way of an example, in order to attain a reduction of the oil dilution, the apparatus may be configured to determine a start of injection of the first pulse of the pair and an end of injection of the second pulse of the pair, in such a way that the start of injection of the previous pulse is closer to a lower boundary value of the subrange than the end of injection of the second pulse of the pair is close to a higher boundary value of the subrange.

As an alternative embodiment, in order to attain a temperature, increase of the exhaust gas, the apparatus may be configured to determine a start of injection of the first pulse of the pair and an end of injection of the second pulse of the pair, in such a way that the end of injection of the second pulse of the pair is closer to a higher boundary value of the subrange than the start of injection of the first pulse of the pair is close to a lower boundary value of the subrange.

BRIEF DESCRIPTION OF THE DRAWINGS

The present disclosure will hereinafter be described in conjunction with the follow g drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
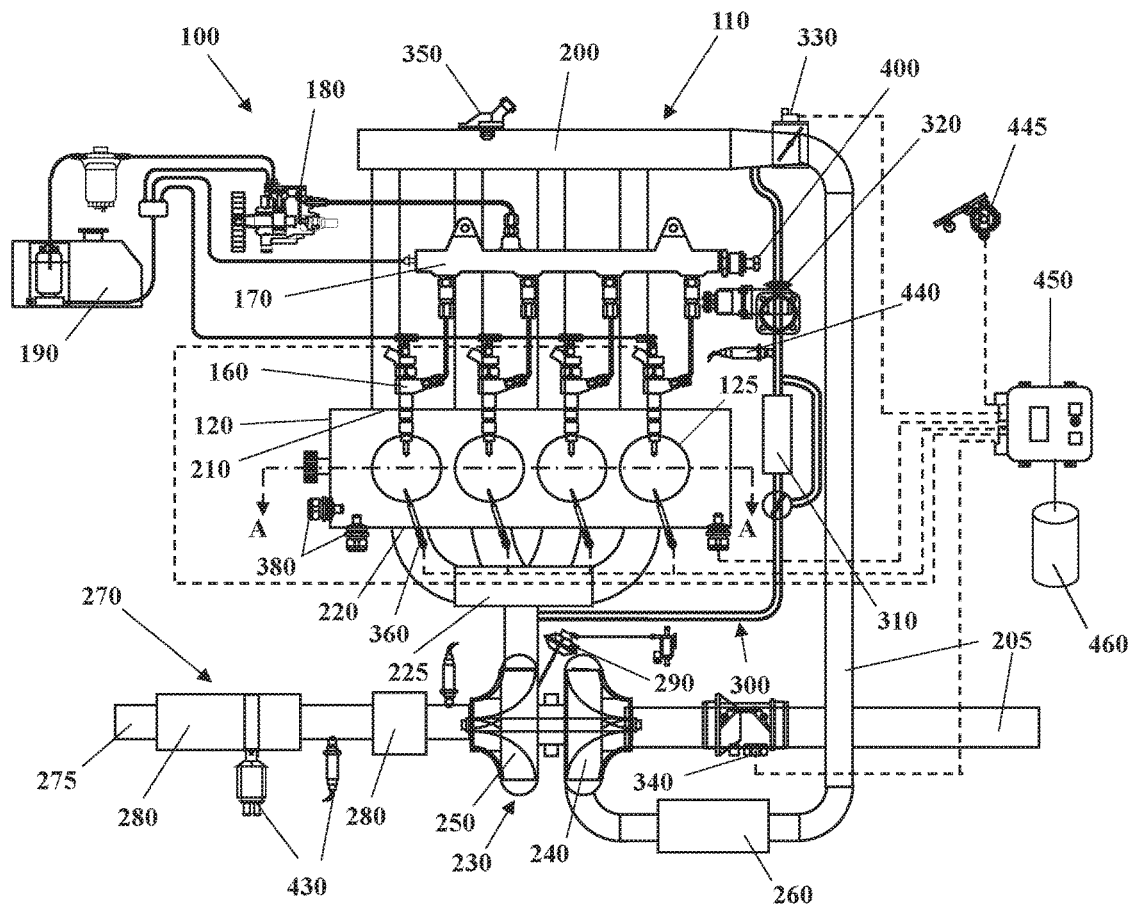
FIG. 1 shows an automotive system.
Figure 2:
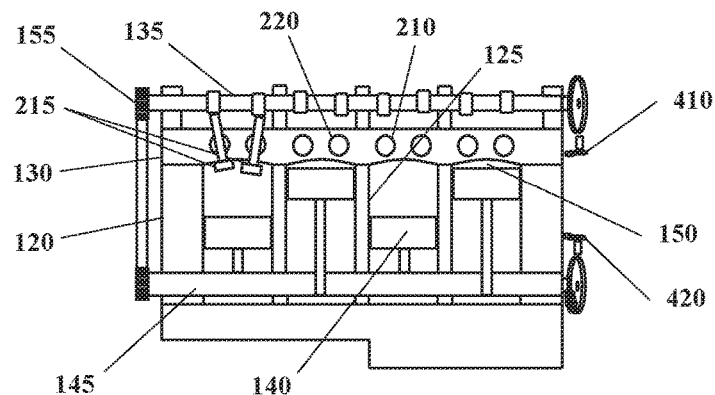
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. The fuel injection system with the above disclosed components is known as common rail Diesel injection system (CR System). The main advantage of this injection system, compared to others, is that due to the high pressure in the system and the electromagnetically controlled injectors it is possible to inject the correct amounts of fuel at exactly the right moment. This implies lower fuel consumption and less emissions.

Each of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the air intake duct 205 and intake manifold 200. An intercooler 260 disposed in the air intake duct 205 may reduce the temperature of the air.

The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust gas aftertreatment system 270. This example shows a variable geometry turbine (VGT) 250 with a VGT actuator 255 arranged to move the vanes to alter the flow of the exhaust gases through the turbine 250.

The exhaust gas aftertreatment system 270 may include an exhaust gas line 275 having one or more exhaust aftertreatment devices 280. The aftertreatment devices 280 may be any device configured to change the composition of the exhaust gases. Some examples of aftertreatment devices 280 include, but are not limited to, catalytic converters (two and three way), oxidation catalysts, for example a Diesel Oxidation Catalyst (DOC), a lean NOx trap (LNT), hydrocarbon adsorbers, a reductant storage device, such as a selective catalytic reduction (SCR) systems or a Selective Catalytic Reduction washcoated particulate filter (SDPF or SCR on DPF) located in the exhaust line 275 downstream of the LNT, and particulate filters, in particular a Diesel Particulate Filter (DPF).

Other embodiments may include an exhaust gas recirculation (EGR) duct 300 coupled between the exhaust manifold 225 and the intake manifold 200. The EGR duct 300 may include an EGR cooler 310 to reduce the temperature of the exhaust gases in the EGR duct 300. An EGR valve 320 regulates a flow of exhaust gases in the EGR duct 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445.

Furthermore, the ECU 450 may generate output signals to various control devices that are arranged to control the operation of the ICE 110, including, but not limited to, the fuel injector 160, the throttle valve 330, the EGR Valve 320, the VGT actuator 255, and the cam phaser 155. Note, dashed lines are used to indicate communication between the ECU 450 and the various sensors and devices, but some are omitted for clarity.

Turning now to the ECU 450, this apparatus may include a digital central processing unit or CPU in communication with a memory system 460 and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
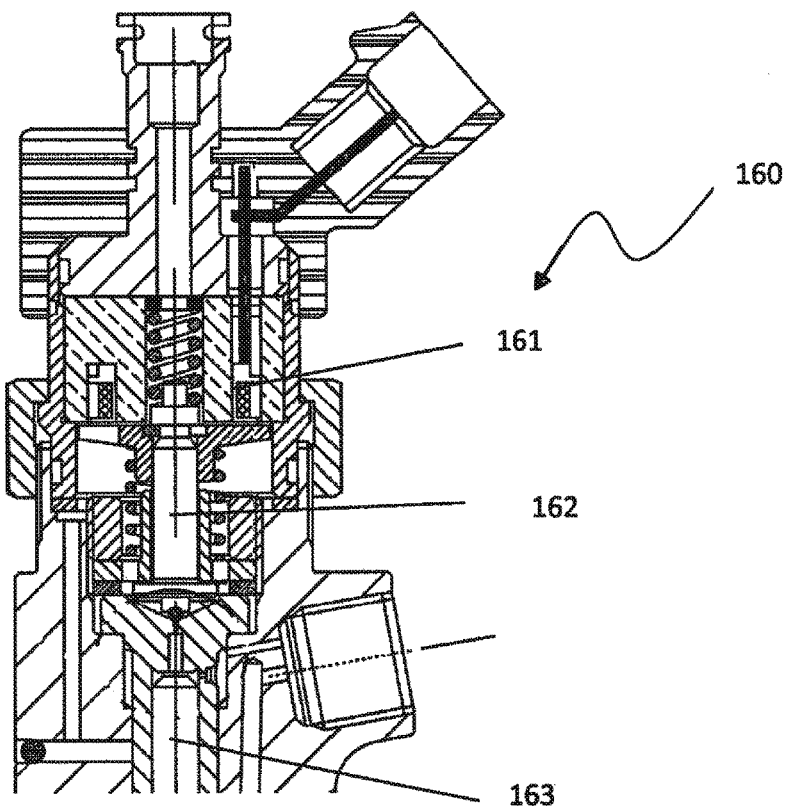
FIG. 3 is a partial section (upper side) of a fuel injector.

FIG. 3 shows a schematic upper section of a fuel injector 160, such as for example an electrically commanded solenoid injector, which includes an injector solenoid 161 controlled by the ECU 450, and an injector actuator 162. As known, the fuel injector 160 also includes a nozzle, provided with an injector needle 163. The ECU 450 operates each fuel injection 160 by energizing the injector solenoid 161.

The fuel coming from the fuel rail 170 reaches the nozzle and can thus be injected into the combustion chamber 150 giving rise to single or multi-injection patterns at each engine cycle.

By way of an example, the movement of the injector needle 163 is caused by the forces acting from above and from below the injector needle 163 itself. The first one is a needle closing force, the other is a needle opening force. Both are the product between a pressure and a sealing surface. When no fuel injection is required, the needle closing force is higher than the needle opening force, thus ensuring that injection holes are covered. On first approximation and for a predetermined injection pressure, the needle opening force can be considered as a constant. Therefore, to cause the raising up of the injector needle 163, it will be sufficient to decrease the needle closing force, for example, by decreasing the pressure, which acts on top of the injector needle 163. Such pressure is due to the fuel, which fills a so called injector control volume. The injector control volume is a small volume inside the injector housing and is delimited by injector housing walls, a first calibrated hole, a second calibrated hole and the top surface of the injector needle 163. The second hole always joins the fuel rail 173 through an injection pipe to the injector control volume. The first hole is normally closed, when no fuel injection is required, otherwise it joins the injector control volume with an injector leakage line at low pressure (as a first approximation, atmospheric pressure), when the fuel injection is performed. The control volume is fed through the second hole and can be emptied through the first hole. When no fuel injection is required, being the first hole closed, the pressure in the control volume is equal to the injection pressure. When the fuel injection is required, being the first hole larger than the second hole, it is possible to discharge the fuel from the control volume, thus reducing the pressure in the control volume itself.

The fuel injection is operated with the aid of the injector solenoid 161 and the injector actuator 162. The injector solenoid 161 is controlled by the ECU 450. The ECU 450 operates each fuel injection, by energizing the injector solenoid 161 for a predetermined period of time (the Energizing Time), causing, in turn, the injector actuator 162 to open the first hole, the fuel discharge from the control volume to the injector leakage line, the pressure decrease in the control volume, the injector needle 163 to raise up and uncover the nozzle. When the energizing tune is ended, the injector actuator 162 will close the first hole and the pressure in the control volume will increase up to the injection pressure value, causing the injector needle 163 to go down and cover the nozzle.

The energizing time (ET) of the fuel injector 160 is determined by ECU 450 as a function of a desired quantity of fuel to be injected.

The fuel coming from the high pressure fuel pump 180 (and the fuel rail 170) enters the fuel injector 160 according to two paths: a first path towards the injector nozzle (this is the fuel, which is injected in the combustion chamber 150), a second path flows to the control volume. When the fuel injector 160 is energized and the control volume opened the injector needle 163 will start raising and the fuel injection will begin.

One of the tasks of the ECU 450 may be that of increasing the temperature of the exhaust gas exiting from the combustion chamber 150, by way of an example in order to warm-up the temperature of the exhaust gas aftertreatment system 270, for example after a cold start of the ICE 110, or in order to operate a regeneration event of one or more of the aftertreatment devices 280.

To do so, the ECU 450 may be performed by switching the ICE 110 from the usual lean combustion mode (lambda value>>1) to a rich combustion mode (e.g. lambda value≤1). The rich combustion mode may be achieved, for example, by actuating the fuel injectors 160 to inject a fuel quantity into the combustion chambers 150 according to a multi-injection pattern including one or more of fuel after-injections.

An after-injection is a fuel injection which is performed by the fuel injector 160 after the Top Dead. Center (TDC) of the piston 140 and starting before the opening of the exhaust ports 220, so that the after-injected fuel quantity actually burns inside the combustion chamber 150 but has not a significant impact on the torque generation.

Figure 4:
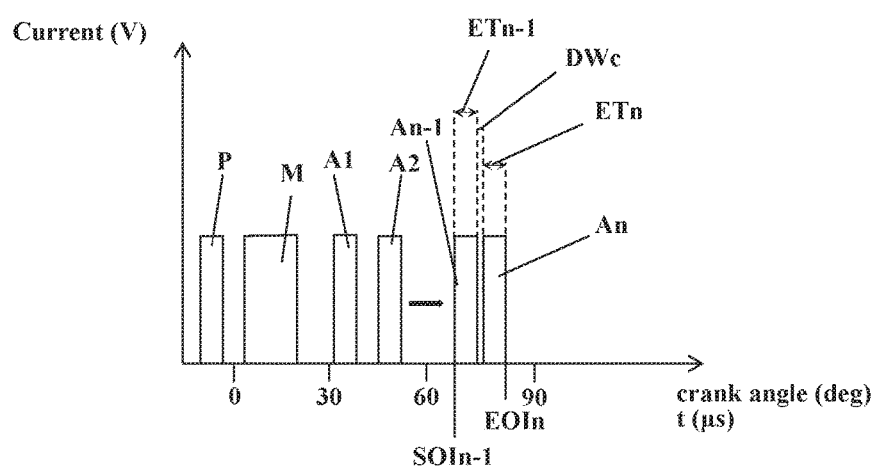
FIG. 4 is a schematic representation of a multi injection pattern.

The present embodiment is hereinafter explained with reference to a single combustion chamber 150, since the operating method is performed equally for each combustion chamber 150 of the ICE 110. As shown in FIG. 4, during the rich combustion mode operation of the ICE 110, a plurality of engine cycles occurs in sequence inside the cylinder 125, each of which includes a fuel injection phase located across the compression stroke and the expansion stroke of the piston 140. The fuel injection phase is carried out by the fuel injector 160 according to a multi-injection pattern, which generally provides for executing a plurality of different injection pulses during the same injection phase.

The multi-injection pattern includes a plurality of consecutive injection pulses which may include a pilot injection pulse P, performed before the TDC of the piston 140, followed by a main injection pulse M, performed across and or immediately after the TDC of the piston 140, followed by a plurality of after-injection pulses (A1 . . . An) starting, therefore, after the TDC of the piston 140.

As a consequence, the most important fuel injection parameters governing the fuel injection phase are: the energizing time ET of each injection pulse, the dwell time DW between each consecutive injection pulses, the start of injection SOI and the end of injection EOI of each pulse.

The energizing time ET of each injection pulse is defined as the duration of the electric signal that commands the fuel injector 160 to open and generally corresponds to the duration of a single injection pulse. Since, after a transitory state, the injector solenoid 161 provides a substantially constant fuel injection rate, it follows that the energizing time ET of each injection pulse strongly influence and determine the fuel quantity that is injected into the combustion chamber 150 at each injection pulse.

The start of injection SOI of each injection pulse is defined as the time in which the electric signal responsible of the injection pulse begins and the end of injection EOI of each injection pulse is defined as the time in which the electric signal responsible of the injection pulse ends. Both SOI and EOI are generally expressed with reference to the rotation of the crankshaft 145 in angular degrees (deg) from TDC. In practice, for each injection pulse the energizing time ET is the time period separating the SOI and the EOI of the same injection pulse.

Each dwell time DW is defined as the time period separating two consecutive pulses of the multi-injection pattern, i.e. the time period between the ending (EOI) of the electric signal responsible of a previous injection pulse and the beginning (SOI) of the electric signal responsible of the consecutive subsequent injection pulse in the multi-injection pattern.

According to an embodiment, the ECU 450) is configured to perform a multi-injection pattern including a plurality of after-injection pulses A1, . . . , An, wherein n is the number of the after-injection pulses predetermined by means of experimental activities and stored in the memory system. The after-injection pulses A1, . . . , An constitutes a sequence of injection pulses, namely a so called multi after-injection pattern, subsequent to a main injection pulse M.

In particular, the ECU 450 is configured to perform the multi after-injection pattern in such a way that the SOI of the first pulse A1 and the EOI of the last pulse An of the after-injection pulses are positioned in a range between 20 and 100 angular degrees from the TDC of the piston 140, preferably in a range between 20 and 80 angular degrees from the TDC of the piston 140.

In particular, the energizing time ET1, . . . ETn, of each after-injection pulse A1, . . . , An of the multi after-injection pattern, each dwell time DW of the multi after-injection pattern, each start of injection SOI (and/or each end of injection EOI) of each after-injection pulse A1, . . . An of the multi after-injection pattern may be a value predetermined by means of experimental activities and stored in the memory system 460.

The ECU 450 is configured to execute at least one pair of consecutive after-injection pulses An−1, An of the plurality of after-injection pulses A1, . . . , An separated by a dwell time DW shorter than 200 µs, preferably shorter the 150 µs, more preferably in a range between 80 and 150 µs. When the after-injection pulses An−1, An of the pair are sufficiently close, they hydraulically fuse together, forming a single fused injection pulse. In detail, the hydraulic fusion, also referred to Injection Quantity Fusion (IQF), is achieved by reducing the dwell time DW separating the consecutive after-injection pulses An−1, An of the pair to a critical value DWc so small, typically less than approximately 200 µs, that the injector solenoid 161 does not have enough time to completely close before it is commanded to open again.

The critical value DWc of the dwell time DW is a value depending from the fuel injector 160 generally furnished as a technical feature of the fuel injector itself by the manufacturer and therefore may be stored in the memory system. More in detail, the pair of consecutive after-injection pulses fused together is constituted by the last two pulses An−1, An of the plurality of successive after-injection pulses A1, . . . , An, wherein the second pulse of the pair is the last injection pulse An of the multi after-injection pattern and the first pulse of the pair is the second last (penultimate) injection pulse An−1 of the multi after-injection pattern.

In particular, the SOI of the second last injection pulse An−1 and/or the EOI of the last injection pulse An may be positioned in a subrange of the above the range, for example a subrange far from TDC of the piston 140, for example included between 70 and 80 angular degrees from the TDC of the piston 140. The SOI of the second last injection pulse An−1 and the EOI of the last injection pulse An are linked, as a matter of fact, knowing the energizing time ETn−1 and the SOI of the second last injection pulse An−1 and the energizing time ETn of the last injection pulse, the EOI of the last injection pulse may be calculated on the basis of the sum of the energizing time ETn−1, the energizing time ETn and the critical value of the dwell time DW. Moreover, knowing the energizing time ETn−1 of the second last injection pulse An−1, the energizing time ETn and the EOI of the last injection pulse An, the SOI of the second last injection pulse An−1 may be calculated on the basis of the sum of the energizing time ETn−1, the energizing time ETn and the critical value of the dwell time DW.

The ECU 450 may be configured to determine the EOI of the last injection pulse An and/or the SOI of the second last injection pulse An−1 into the above the range on the basis of a target strategy, wherein the target strategy may provide for the ECU 450 to maximize the temperature increase of the exhaust gas or minimize the oil dilution or minimizing the fuel consumption. In detail, the ECU 450 may perform a multi-after injection pattern wherein the SOI of the second last injection pulse An−1 is closer to the lower boundary value of the above the subrange (namely the boundary value closest to the TDC of the piston 140, e.g. 70 degrees) than the EOI of the last injection pulse An is close to the higher boundary value of the subrange (namely the boundary value farthest from the TDC of the piston 140, e.g. 80 degrees); in this case, the oil dilution may be minimized.

On the contrary, the ECU 450 may perform a multi-after injection pattern wherein the EOI of the last injection pulse An is closer to the higher boundary value of the above the subrange (80 degrees) than the SOI of the second last injection pulse An−1 is close to the lower boundary value of the far subrange (e.g. 70 degrees); in this case, the temperature of the exhaust gas may be maximized. Again, the ECU 450 may perform a multi-after injection pattern wherein the SOI of the second last injection pulse An−1 is far from the lower boundary value of the above the subrange (e.g. 70 degrees) of a time distance (angular degrees) similar to (i.e. approximatively equal to) the time distance that exists from the EOI of the last injection pulse An and the higher boundary value of the far subrange (80 degrees); in this case, the fuel consumption may be minimized. By way of an alternative example, the subrange may be near to TDC of the piston 140 for example included between 20 and 30 angular degrees from the TDC of the piston 140.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating a fuel injector of an internal combustion engine having a reciprocating piston, the method comprising:
    performing a multi after-injection pattern having at least one pair of consecutive injection pulses both starting after a top dead center of the piston and separated by a dwell time shorter than 200 µs.

2. The method of claim 1, wherein the dwell time is in a range between 80 and 150 µs.

3. The method of claim 1, wherein the pair of injection pulses comprise the last two injection pulses of the multi after-injection pattern.

4. The method according to claim 1, further comprising starting a first pulse and ending a second pulse in a range between 20 and 80 angular degrees of a crankshaft from the top dead center of the piston.

5. The method according to claim 4, further comprising starting the first pulse and ending the second pulse in a subrange of the range.

6. The method according to claim 5, further comprising determining a start of injection of the first pulse and an end of injection of the second pulse, wherein the start of injection of the previous pulse is closer to a lower boundary value of the subrange than the end of injection of the second pulse of the pair is to a higher boundary value of the subrange.

7. The method according to claim 5, further comprising determining a start of injection of the first pulse and an end of injection of the second pulse, wherein the end of injection of the second pulse of the pair is closer to a higher boundary value of the subrange than the start of injection of the first pulse of the pair is to a lower boundary value of the subrange.

8. A non-transitory computer readable medium including a computer program for operating a fuel injector of an internal combustion engine having a reciprocating piston, the computer program comprising a program code, when run on a computer, configured to actuate the fuel injector for performing a multi after-injection pattern having at least one pair of consecutive injection pulses both starting after a top dead center of the piston and separated by a dwell time shorter than 200 µs.

9. An injection system of an internal combustion engine having a reciprocating piston, the injection system comprising a fuel injector and an electronic control unit configured to actuate the fuel injector for performing a multi after-injection pattern having at least one pair of consecutive injection pulses both starting after a top dead center of the piston and separated by a dwell time shorter than 200 μs.

10. An internal combustion engine equipped with an injection system according to claim 9.

* * * * *